(12) United States Patent
Bugbee et al.

(10) Patent No.: US 11,557,183 B2
(45) Date of Patent: Jan. 17, 2023

(54) SOCIAL DISTANCING DEVICE, SYSTEM AND METHOD

(71) Applicants: Catherine Bugbee, Petaluma, CA (US); Marcos Tzannes, Petaluma, CA (US)

(72) Inventors: Catherine Bugbee, Petaluma, CA (US); Marcos Tzannes, Petaluma, CA (US)

( * ) Notice: Subject to any disclaimer, the term of this patent is extended or adjusted under 35 U.S.C. 154(b) by 0 days.

(21) Appl. No.: 17/208,200

(22) Filed: Mar. 22, 2021

(65) Prior Publication Data

US 2021/0295662 A1 Sep. 23, 2021

Related U.S. Application Data

(60) Provisional application No. 62/993,119, filed on Mar. 23, 2020.

(51) Int. Cl.
| | | |
|---|---|---|
| G08B 7/06 | (2006.01) | |
| H04B 17/318 | (2015.01) | |
| H04W 4/80 | (2018.01) | |
| H04W 4/90 | (2018.01) | |
| G08B 21/22 | (2006.01) | |
| G08B 25/00 | (2006.01) | |
| H04W 4/02 | (2018.01) | |

(52) U.S. Cl.
CPC .............. *G08B 7/06* (2013.01); *G08B 25/008* (2013.01); *H04B 17/318* (2015.01); *H04W 4/023* (2013.01); *H04W 4/80* (2018.02); *H04W 4/90* (2018.02)

(58) Field of Classification Search
CPC ...................................... G08B 7/06
See application file for complete search history.

(56) References Cited

U.S. PATENT DOCUMENTS

| | | | |
|---|---|---|---|
| 6,992,581 B2 * | 1/2006 | Reisman | G01S 11/06 340/539.12 |
| 2016/0366557 A1 * | 12/2016 | Gallegos | H04W 68/00 |
| 2018/0040223 A1 * | 2/2018 | Bodi | G08B 21/086 |
| 2021/0314729 A1 * | 10/2021 | Morgenthau | H04B 17/318 |

\* cited by examiner

*Primary Examiner* — Joseph H Feild
*Assistant Examiner* — Pameshanand Mahase
(74) *Attorney, Agent, or Firm* — Jason H. Vick; Sheridan Ross, PC

(57) ABSTRACT

A social distancing system that addresses maintaining a minimum social distance of 6 ft during a pandemic by using social distancing devices that determine the distance between devices and generate alarms when the minimum social distance is violated.

21 Claims, 3 Drawing Sheets

SOCIAL DISTANCING DEVICE, SYSTEM AND METHOD

RELATED APPLICATION DATA

This application claims the benefit of and priority under 35 U.S.C. § 119(e) to U.S. Provisional Patent Application No. 62/993,119, filed Mar. 23, 2020, entitled "SOCIAL DISTANCING DEVICE," which is incorporated herein by reference in its entirety.

FIELD

An exemplary aspect relates to a social distancing device. More specifically, exemplary methods, systems, means and computer-readable storage media, are directed towards generating alarms when a minimum social distance rule is being violated.

BACKGROUND

This technology addresses the need to maintain a social distance during pandemics such as the COVID-19 pandemic of 2020. Social distancing is one of the primary tools to combat a pandemic and there is a need for a device that indicates when social distancing rules are not being followed.

SUMMARY

Aspects of the technology relate to:

A social distancing system comprising a first social distancing device and a second social distancing device, the first social distancing device comprises one or more processors and/or one or more ASICs that are capable of determining a first distance from the first social distancing device to the second social distancing device using a first wireless signal, the first social distancing device is further capable of generating a first alarm if the first distance determined by the first social distancing device is greater than a first minimum social distance.

The social distancing system of the aspect above, wherein the first minimum social distance is 6 ft or 2 meters.

The social distancing system of any of the aspects above, wherein the first alarm is a first sound and/or a first verbal warning.

The social distancing system of any of the aspects above, wherein the first alarm is a first vibration of the first social distancing device.

The social distancing system of any of the aspects above, wherein the first alarm is a first light flickering.

The social distancing system of any of the aspects above, further comprising a third social distancing device wherein the one or more processors and/or one or more ASICs are further capable of determining a second distance from the first social distancing device to the third social distancing device using a second wireless signal and the first social distancing device is further capable of generating a second alarm if the second distance determined by the first social distancing device is greater than a second minimum social distance, wherein the second alarm is different than the first alarm and the second minimum social distance is different than the first minimum social distance.

The social distancing system of any of the aspects above, further comprising a third social distancing device wherein the one or more processors and/or one or more ASICs are further capable of determining the no alarm is to be generated when the first social distancing device is at any distance from the third social distancing device.

The social distancing system of any of the aspects above, further comprising a third social distancing device wherein the one or more processors and/or one or more ASICs are further capable of determining a second distance from the first social distancing device to the third social distancing device using a second wireless signal and the first social distancing device is further capable of generating a second alarm if the second distance determined by the first social distancing device is greater than a second minimum social distance, wherein the second alarm is different than the first alarm and the second minimum social distance is different than the first minimum social distance, and wherein the second alarm is a second sound and/or a second verbal warning, wherein the second sound is different than the first sound and the second verbal warning is different than the first verbal warning.

The social distancing system of any of the aspects above, further comprising a third social distancing device wherein the one or more processors and/or one or more ASICs are further capable of determining a second distance from the first social distancing device to the third social distancing device using a second wireless signal and the first social distancing device is further capable of generating a second alarm if the second distance determined by the first social distancing device is greater than a second minimum social distance, wherein the second alarm is different than the first alarm and the second minimum social distance is different than the first minimum social distance, and wherein the second alarm is a second vibration, wherein the second vibration is different than the first vibration.

The social distancing system of any of the aspects above, further comprising a third social distancing device wherein the one or more processors and/or one or more ASICs are further capable of determining a second distance from the first social distancing device to the third social distancing device using a second wireless signal and the first social distancing device is further capable of generating a second alarm if the second distance determined by the first social distancing device is greater than a second minimum social distance, wherein the second alarm is different than the first alarm and the second minimum social distance is different than the first minimum social distance, and wherein the wherein the second alarm is a second light flickering, wherein the second light flickering is different than the first light flickering.

The social distancing system of any of the aspects above, wherein the first distance is capable of being determined using a Received Signal Strength Indication (RSSI) of a Bluetooth Low Energy signal.

The social distancing system of any of the aspects above, wherein the first distance is capable of being determined based on the equation:

Distance (in meters)=$10^{((MeasuredPower-RSSI)/(10*N))}$, wherein the MeasuredPower is the expected/measured RSSI (in dB) at 1 meter distance and N is a constant that depends on environmental factors.

The social distancing system of any of the aspects above, wherein the first and social distancing devices are mobile phones and/or watches and/or belt clips and/or badges.

A method for social distancing, comprising:

determining a first distance from the first social device to the second social distancing device using a first wireless signal, generating a first alarm if the first distance is greater than a first minimum social distance.

The method of the aspect above, wherein the first minimum social distance is 6 ft or 2 meters.

The method of any of the aspects above, wherein the first alarm is a first sound and/or a first verbal warning.

The social distancing system of any of the aspects above, wherein the first alarm is a first vibration of the first social distancing device.

The method of any of the aspects above, wherein the first alarm is a first light flickering.

The method of any of the aspects above, comprising further determining a second distance from the first social distancing device to a third social distancing device using a second wireless signal and generating a second alarm if the second distance is greater than a second minimum social distance, wherein the second alarm is different than the first alarm and the second minimum social distance is different than the first minimum social distance.

The method of any of the aspects above, further comprising determining that no alarm is to be generated when the first social distancing device is at any distance from a third social distancing device.

The method of any of the aspects above, further comprising determining a second distance from the first social distancing device to a third social distancing device using a second wireless signal and generating a second alarm if the second distance is greater than a second minimum social distance, wherein the second alarm is different than the first alarm and the second minimum social distance is different than the first minimum social distance, and wherein the second alarm is a second sound and/or a second verbal warning, wherein the second sound is different than the first sound and the second verbal warning is different than the first verbal warning.

The method of any of the aspects above, further comprising determining a second distance from the first social distancing device to a third social distancing device using a second wireless signal and generating a second alarm if the second distance is greater than a second minimum social distance, wherein the second alarm is different than the first alarm and the second minimum social distance is different than the first minimum social distance, and wherein the second alarm is a second vibration, wherein the second vibration is different than the first vibration.

The method of any of the aspects above, further comprising determining a second distance from the first social distancing device to a third social distancing device using a second wireless signal and generating a second alarm if the second distance is greater than a second minimum social distance, wherein the second alarm is different than the first alarm and the second minimum social distance is different than the first minimum social distance, and wherein the wherein the second alarm is a second light flickering, wherein the second light flickering is different than the first light flickering.

The method of any of the aspects above, further comprising determining the first distance using a Received Signal Strength Indication (RSSI) of a Bluetooth Low Energy signal.

The method of any of the aspects above, further comprising determining the first distance based on the equation:

Distance (in meters)=10^((MeasuredPower−RSSI)/(10*N), wherein the MeasuredPower is the expected/measured RSSI (in dB) at 1 meter distance and N is a constant that depends on environmental factors.

A non-transitory computer readable information storage media having stored therein instructions, that when executed by one or more processors, cause to be performed any of the methods in any of the aspects described above.

BRIEF DESCRIPTION OF THE DRAWINGS

The exemplary embodiments will be described in detail, with reference to the following figures, wherein.

DETAILED DESCRIPTION

Figure 1:
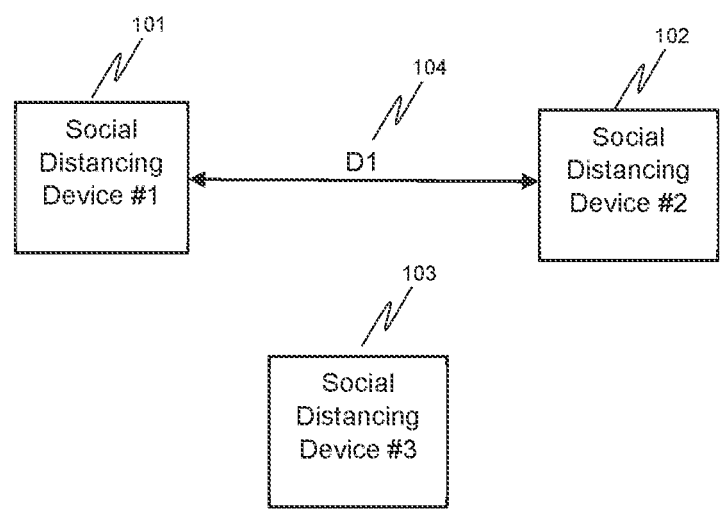
FIG. 1 illustrates an exemplary social distancing system comprising three social distancing devices.

An exemplary social distancing system comprises a plurality of social distancing devices. FIG. 1 illustrates an exemplary social distancing system with 3 social distancing devices, social distancing device #1 (101 in FIG. 1), social distancing device #2 (102 in FIG. 1) and social distancing device #3 (103 in FIG. 1). Social distancing devices #1 and #2 are separated by a distance D1 (104 in FIG. 1).

When the distance D1 between social distancing device #1 and social distancing device #2 is less than (or less than or equal to) a minimum social distance (e.g. 6 feet or 2 meters) an alarm is generated. The alarm could be generated by social distancing device #1 and/or social distancing device #2. The alarm could be a sound and/or a verbal warning and/or a vibration and/or light flickering.

Figure 2:
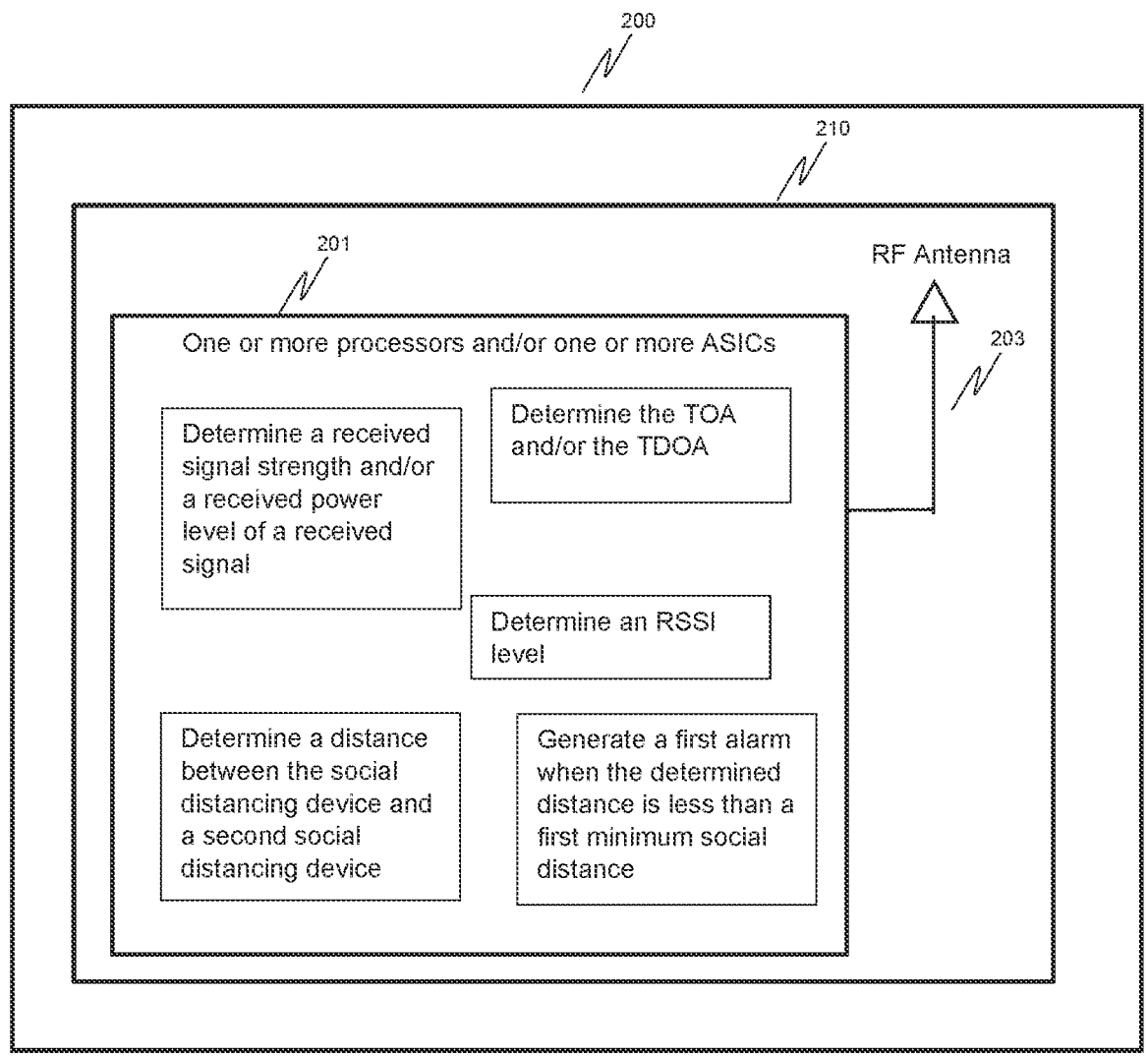
FIG. 2 illustrates an exemplary social distancing device.

An exemplary social distancing device 200 is illustrated in FIG. 2. The exemplary social distancing device comprises a wireless transceiver 210, comprising a wireless transmitter and a wireless receiver. The exemplary social distancing device comprises one or more processors and/or one or more application-specific integrated circuits (ASICs) 201 and one or more RF antennas 203. The one or more processors and one or more ASICs are capable of determining a received signal strength and/or a received power level of a received signal. In one exemplary embodiment, the determined received signal strength is an RSSI level of a Bluetooth Low Energy (BLE) signal of the BLE standard. The BLE standard is available at www.bluetooth.com and is incorporated herein by reference in its entirety. Alternatively, or in addition the one or more processors and/or the one or more ASICs are further capable of determining the Time of Arrival (TOA) and/or the Time Difference of Arrival (TDOA) as specified in the Ultra-Wide Band (UWB) standard. The UWB standard is available at https://standards.ieee.org/ and is incorporated herein by reference in its entirety. The one or more processors and/or the one or more ASICs are further capable of determining a first distance between the social distancing device and a second social distancing device (102 in FIG. 1). In one exemplary embodiment, the RSSI and/or the DTOA and/or the TDOA are used to determine the first distance between the social distancing device and a second social distancing device. The one or more processors and/or the one or ASICs are further capable of generating a first alarm when the determined first distance is less than (or less than or equal to) a first minimum social distance. In one exemplary embodiment the first minimum social distance is 6 feet or 2 meters. The first alarm could be a first sound and/or a first verbal warning and/or a first vibration and/or a first light flickering.

In one exemplary embodiment, alternatively, or in addition to using BLE signals and/or UWB signals for determining the distance, other wireless technologies are used, such as Wi-Fi and/or cellular technologies.

In one exemplary embodiment, the one or more processors and/or the one or more ASICs are further capable of determining a second distance between the social distancing device and a third social distancing device (103 in FIG. 1). The one or more processors and/or the one or more ASICs are further capable of generating a second alarm when the determined second distance is less than a second minimum social distance, wherein the second minimum social distance is different than the first minimum social distance. In one exemplary embodiment the first minimum social distance is greater than the second minimum social distance. In one exemplary embodiment the first minimum social distance is less than the second minimum social distance. The second alarm could be a second sound and/or a verbal warning and/or a vibration and/or light flickering. In one exemplary embodiment the first sound is different than the second sound and/or the first verbal warning is different than the second verbal warning and/or the first vibration is different than the second vibration and/or the first light flickering is different than the second light flickering (e.g., at a different speed or rate).

In one exemplary embodiment, the one or more processors and/or the one or more ASICs are further capable of identifying a third social distancing device as one that does not require any social distance. For example, the minimum social distance between the third device and the first device is 0 feet or 0 meters. In this case, no alarm is generated if the distance between the first social distancing device and the third social distancing device is less than the first minimum social distance (e.g. 6 ft or 2 meters) which was used for the first and second device.

In one exemplary embodiment with BLE technology the distance between the first social distancing device and the second social distancing device could be determined using Received Signal Strength (RSS) measurements and distance-based path-loss modelling as specified in the BLE standard. For example, the distance between two devices could be determined using the Received Signal Strength Indication (RSSI) and then calculating the distance based on calculations that include:

$$\text{Distance (in meters)} = 10^{((\text{MeasuredPower} - \text{RSSI})/(10*N))}$$

Where the MeasuredPower is the expected/measured RSSI (in dB) at 1 meter distance and N is a constant that depends on environmental factors. For example, N can take on values between 2 and 4.

Additionally, or alternatively, with UWB technology the distance between the first social distancing device and the second social distancing device could be determined using the Time of Arrival (TDOA) and/or the Time Difference of Arrival (TDOA) specified in the UWB standard. For example, the TOA can be used to determine the distance by measuring the propagation delay between the transmitter in the first social distancing device and the receiver in the second social distancing device. Additionally, or alternatively, the TDOA can be used to determine the distance by determining the arrival time of signals (e.g. packets or blinks) transmitted between the two devices as specified in the UWB standard.

In one exemplary embodiment the social distancing device is a device that is specifically designed for this purpose. For example, the social distancing device could be a wearable such as a watch, a necklace, a badge, a belt clip, and the like.

In one exemplary embodiment the first social distancing device is configurable to set a plurality of social distancing rules for a plurality of other social distancing devices. For example, the device could be configurable to set a first social distancing rule of 6 feet for the general public (or a first group of people) and a second social distancing rule of 0 feet for family members (or a second group of people). For example, an alarm such as a sound and/or a verbal warning and/or a vibration and/or a light flickering will be made by the social distancing device when the social distancing device is within 6 feet of a second social distancing device that is for the general public (or the first group of people) and therefore the first social distancing rule with a 6 feet minimum social distance is being violated. But no alarm would be made by the social distancing device when it is at any distance from a third social distancing device that is for family members (or the second group of people) because the second social distancing rule has a minimum social distance of 0 feet (i.e. there is no minimum social distance).

In one exemplary embodiment the social distancing device is a mobile phone. In this case, for example, the device could be a mobile phone that is running an application for this purpose that is program. For example, the first mobile phone used by a first person could use a wireless signal (e.g. Bluetooth, Wi-Fi signal, LTE signal, BLE, UWB)) to determine the distance between the first mobile phone on the first person and the second mobile phone on a second person. Based on this distance determination, the first mobile phone would cause an alarm based on the social distancing rule for that second person (and second device). For example, if the second person had a social distancing rule of 6 feet then Bluetooth or UWB technology operating in the first and the second mobile phone would be used to determine when the second person was within the 6-foot radius of the first person and then would cause an alarm (e.g. sound, verbal warning, vibration, light flickering).

In one exemplary embodiment there are more than one social distancing rule for a user's mobile phone. For example, a person could have a first social distancing rule of 6 feet for the general public and a second social distancing rule of 3 feet for family members. For example, a first type of sound or verbal warning would be made by the mobile phone when the first social distancing rule of 6 feet is violated and a second type of sound or verbal warning would be made by the mobile phone when the second social distancing rule of 3 feet is violated. Alternatively, or in addition, for example, a first type of vibration would be made by the mobile phone when the first social distancing rule is violated and a second type of vibration would be made when the second social distancing rule is violated. Alternatively, or in addition, for example, a first type of light flickering would be made by the mobile phone when the first social distancing rule is violated and a second type of light flickering (at a different speed or rate) would be made when the second social distancing rule is violated. For example, if the two people were in the same family and there was no social distancing required (radius of 0 feet) then the mobile phone would not sound an alarm for any distance. Alternatively, or in addition, a person's mobile phone could have three rules social distancing rules. For example, a person could have a 3-foot social distancing rule with a first member of the family while also having no social distance requirement (0-foot radius) with a second member of the family. In this case, for example, the mobile phone would operate to cause different alarms based on these different social distancing rules while at the same time still causing an alarm for the general public (non-family members) social distancing rule of 6 feet.

In one embodiment, the user configures the mobile phone (e.g. via the social distancing application running on the mobile phone) to establish the different social distancing rules. For example, the mobile phone could be configured so that the spouse of the user of the mobile phone has no social distancing rule (radius of 0 feet) while the children have a social distancing rule of 3 feet. This could be done by inputting the phone number (or some other digital identifier such as email, twitter, etc.) of each person in the family and assigning to it a specific social distance radius. There could also be a default social distance rule/radius for non-family members (or general public) of 6 feet. This default distance could also be changed to a different distance (e.g. 10 feet) via the social distancing application running on the phone.

Alternatively, or in addition the social distancing application on the mobile phone automatically turns off when the phone detects that it has entered a person's home and all alarms are disabled. For example, when the mobile phone detects that it has entered the home the social distancing application is automatically turned off. Alternatively, or in addition, when a person arrives home the social distancing application on the mobile phone automatically changes from a first radius/rule to a second, different radius/rule. For example, when outside the home there could be 6-foot social distance rule for the general public. But when arriving and entering the home the radius could automatically switch to a 3-foot radius (or some other user configurable value) that is appropriate for family members. The mobile phone could use wireless signals such as Wi-Fi, or LTE, or BLE or UWB to detect when the user has entered the home and automatically perform these functions. Alternatively, or in addition the user could manually switch the device to a 3-foot radius when entering the home using a switch on the device itself or some other method such as software or applications used to control the device.

Figure 3:
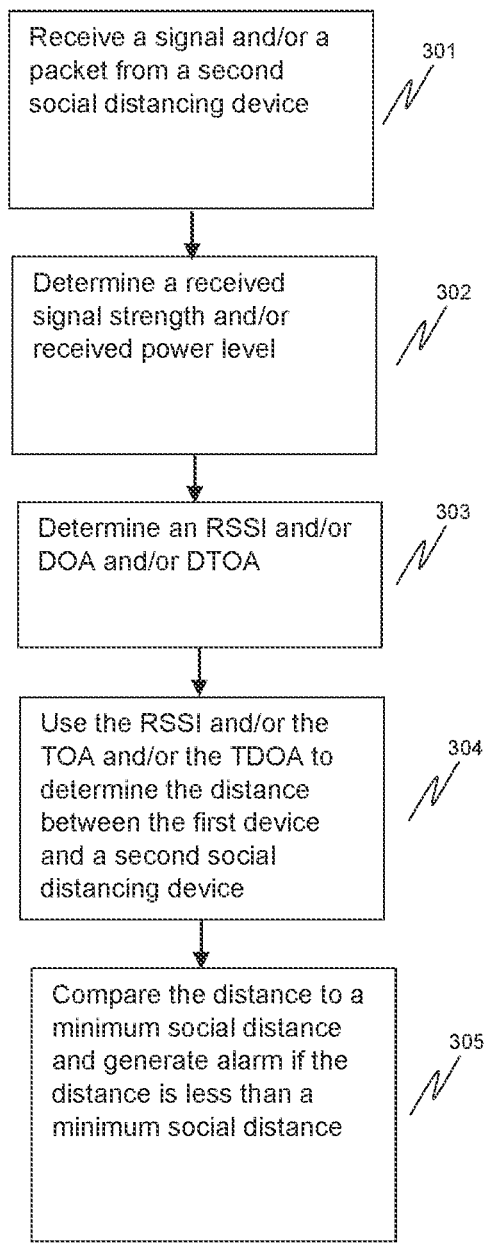
FIG. 3 illustrates an exemplary social distancing method.

FIG. 3 illustrates an exemplary social distancing method in a first exemplary social distancing device. In step 301, the social distancing device receives a signal and/or a packet from a second social distancing device. The received signal may be, for example, a BLE signal and/or a UWB signal and/or a WiFi signal and/or a cellular signal. The received packet may be, for example, a BLE packet and/or a UWB packet and/or a WiFi packet and/or a cellular packet. In step 302, the social distancing device determines a received signal strength and/or received power level. In step 303, the social distancing device determines an RSSI based on the BLE standard and/or the Time of Arrival (TOA) and/or the Time Difference of Arrival (TDOA) based on the UWB standard. In step 304, the social distancing device uses the RSSI and/or the TOA and/or the TDOA to determine the distance between the first social distancing device and a second social distancing device. In step 305, the distance is compared to a minimum social distance and if the determined distance is less than a minimum social distance an alarm is generated. The alarm could be a sound and/or a verbal warning and/or a vibration and/or a light flickering.

While the flowchart in FIG. 3 has been discussed in relation to a particular sequence of events, it should be appreciated that one or more changes to this sequence can occur without materially effecting the operation of the embodiments. Additionally, the exact sequence of events need not occur as set forth in the exemplary embodiments. Moreover, the steps in the flowcharts are optional, with some of or all of the steps being performed. For example, a particular step such as step 302 in FIG. 3 may not be performed when using the DOA or DTOA to determine the distance.

While some of the descriptions above use a mobile phone as the exemplary device, any device capable of running an application and/or designed for this purpose could be used. For example, the device could be a smart watch, apple watch, headphones, necklace, badge, or a standalone device specifically designed to implement the social distancing functions.

While the invention is described in terms of exemplary embodiments, it should be appreciated that any of the aspects of the invention described herein in connection with the exemplary embodiments could be separately and individually claimed. Additionally one or more of the features of the various embodiments can be combined with one or more features discussed in relation to one or more other embodiments.

Additionally, the devices, methods and protocols of one aspect of this technology can be implemented on a special purpose computer, a programmed micro-processor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, any comparable means, or the like. In general, any device capable of implementing a state machine that is in turn capable of implementing the methodology illustrated herein can be used to implement the various methods, protocols and techniques according to this technology.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM1926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed methods may be readily implemented in software on an embedded processor, a micro-processor or a digital signal processor. The implementation may utilize either fixed-point or floating-point operations or both. In the case of fixed-point operations, approximations may be used for certain mathematical operations such as logarithms, exponentials, etc. Alternatively, the disclosed device may be implemented partially or fully in hardware using standard logic circuits or VLSI design. Whether software or hardware is used to implement the devices in accordance with this technology is dependent on the speed and/or efficiency requirements of the device, the particular function, and the particular software or hardware devices or microprocessor or microcomputer devices being utilized. The devices and methods illustrated herein can be readily implemented in hardware and/or software using any known or later developed devices or structures, devices and/or software by those of ordinary skill in the applicable art from the functional description provided herein and with a general basic knowledge of the audio processing arts.

Moreover, the disclosed methods may be readily implemented in software that can be stored on a storage medium, executed on programmed general-purpose computer with the cooperation of a controller and memory, a special purpose computer, a microprocessor, or the like. In these instances, the devices and methods of this technology can be implemented as program embedded on personal computer such as an applet, JAVA® or CGI script, as a resource residing on a server or computer workstation, as a routine embedded in a dedicated device or device component, or the like. The device can also be implemented by physically incorporating the device and/or method into a software and/or hardware device, such as the hardware and software devices of an electronic device.

Any non-transitory computer-readable information storage media, having stored thereon instructions, that can be executed by one or more processors and/or one more ASICs and cause to be performed the methods described above.

Finally, the disclosed methods may be readily implemented as services or applications accessible from the user via a web browser. The software can reside in a local server or a remote server. The software may be written in JavaScript utilizing JavaScript Web APIs such as the Web Audio API or make use of Web Assembly.

It is therefore apparent that there has been provided, in accordance with the present technology, devices and methods of providing social distancing during a pandemic. While this technology has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this technology.

The invention claimed is:

1. A social distancing system comprising:
a first social distancing device and a second social distancing device,
the first social distancing device comprises one or more processors and/or one or more Application Specific Integrated Circuits (ASICs) that are capable of determining a first distance from the first social distancing device to the second social distancing device using a first wireless signal, and
the first social distancing device is further capable of generating a first alarm if the first distance determined by the first social distancing device is less than a first minimum social distance
wherein the first minimum social distance is 6 ft or 2 meters,
wherein the first distance is capable of being determined based on the equation:

$$\text{Distance (in meters)} = 10^{((\text{MeasuredPower} - \text{RSSI})/(10*N))},$$

wherein the MeasuredPower is the expected/measured Received Signal Strength Indication (RSSI (in dB) at 1 meter distance and N is a constant that depends on environmental factors.

2. The social distancing system of claim 1, wherein the first alarm is a first sound and/or a first verbal warning.

3. The social distancing system of claim 2, further comprising a third social distancing device wherein the one or more processors and/or one or more ASICs are further capable of determining a second distance from the first social distancing device to the third social distancing device using a second wireless signal and the first social distancing device is further capable of generating a second alarm if the second distance determined by the first social distancing device is less than a second minimum social distance, wherein the second alarm is different than the first alarm and the second minimum social distance is different than the first minimum social distance, and wherein the second alarm is a second sound and/or a second verbal warning, wherein the second sound is different than the first sound and the second verbal warning is different than the first verbal warning.

4. The social distancing system of claim 1, wherein the first alarm is a first vibration of the first social distancing device.

5. The social distancing system of claim 4, further comprising a third social distancing device wherein the one or more processors and/or one or more ASICs are further capable of determining a second distance from the first social distancing device to the third social distancing device using a second wireless signal and the first social distancing device is further capable of generating a second alarm if the second distance determined by the first social distancing device is less than a second minimum social distance, wherein the second alarm is different than the first alarm and the second minimum social distance is different than the first minimum social distance, and wherein the second alarm is a second vibration, wherein the second vibration is different than the first vibration.

6. The social distancing system of claim 1, wherein the first alarm is a first light flickering.

7. The social distancing system of claim 6, further comprising a third social distancing device wherein the one or more processors and/or one or more ASICs are further capable of determining a second distance from the first social distancing device to the third social distancing device using a second wireless signal and the first social distancing device is further capable of generating a second alarm if the second distance determined by the first social distancing device is less than a second minimum social distance, wherein the second alarm is different than the first alarm and the second minimum social distance is different than the first minimum social distance, and wherein the wherein the second alarm is a second light flickering, wherein the second light flickering is different than the first light flickering.

8. The social distancing system of claim 1, further comprising a third social distancing device wherein the one or more processors and/or one or more ASICs are further capable of determining a second distance from the first social distancing device to the third social distancing device using a second wireless signal and the first social distancing device is further capable of generating a second alarm if the second distance determined by the first social distancing device is less than a second minimum social distance, wherein the second alarm is different than the first alarm and the second minimum social distance is different than the first minimum social distance.

9. The social distancing system of claim 1, further comprising a third social distancing device wherein the one or more processors and/or one or more ASICs are further capable of determining the no alarm is to be generated when the first social distancing device is at any distance from the third social distancing device.

10. The social distancing system of claim 1, wherein the Received Signal Strength Indication (RSSI) is based on a Bluetooth Low Energy signal.

11. The social distancing system of claim 1, wherein the first and second social distancing devices are mobile phones and/or watches and/or belt clips and/or badges.

12. A non-transitory computer readable information storage media having stored therein instructions, that when executed by one or more processors, cause to be performed a method for social distancing, comprising:
  determining a first distance from the first social device to the second social distancing device using a first wireless signal, and
  generating a first alarm if the first distance is less than a first minimum social distance
  wherein the first minimum social distance is 6 ft or 2 meters,
  wherein the first distance is capable of being determined based on the equation:

Distance (in meters)=10^((MeasuredPower−RSSI)/(10*N)), wherein the MeasuredPower is the expected/measured Received Signal Strength Indication (RSSI (in dB) at 1 meter distance and N is a constant that depends on environmental factors.

13. The media of claim 12, wherein the first alarm is a first sound and/or a first verbal warning.

14. The media of claim 12, wherein the first alarm is a first vibration of the first social distancing device.

15. The media of claim 14, further comprising determining a second distance from the first social distancing device to a third social distancing device using a second wireless signal and generating a second alarm if the second distance is less than a second minimum social distance, wherein the second alarm is different than the first alarm and the second minimum social distance is different than the first minimum social distance, and wherein the second alarm is a second vibration, wherein the second vibration is different than the first vibration.

16. The media of claim 12, wherein the first alarm is a first light flickering.

17. The media of claim 16, further comprising determining a second distance from the first social distancing device to a third social distancing device using a second wireless signal and generating a second alarm if the second distance is less than a second minimum social distance, wherein the second alarm is different than the first alarm and the second minimum social distance is different than the first minimum social distance, and wherein the wherein the second alarm is a second light flickering, wherein the second light flickering is different than the first light flickering.

18. The media of claim 12, comprising further determining a second distance from the first social distancing device to a third social distancing device using a second wireless signal and generating a second alarm if the second distance is less than a second minimum social distance, wherein the second alarm is different than the first alarm and the second minimum social distance is different than the first minimum social distance.

19. The media of claim 12, further comprising determining that no alarm is to be generated when the first social distancing device is at any distance from a third social distancing device.

20. The social distancing system of claim 12, further comprising determining a second distance from the first social distancing device to a third social distancing device using a second wireless signal and generating a second alarm if the second distance is less than a second minimum social distance, wherein the second alarm is different than the first alarm and the second minimum social distance is different than the first minimum social distance, and wherein the second alarm is a second sound and/or a second verbal warning, wherein the second sound is different than the first sound and the second verbal warning is different than the first verbal warning.

21. The media of claim 12, further comprising determining Received Signal Strength Indication (RSSI) based on a Bluetooth Low Energy signal.

\* \* \* \* \*